United States Patent
Hortin

(10) Patent No.: US 9,533,867 B2
(45) Date of Patent: Jan. 3, 2017

(54) BEVERAGE DISPENSING SYSTEM WITH USER CUSTOMIZABLE INPUTS

(71) Applicant: Whirlpool Corporation, Benton Harbor, MI (US)

(72) Inventor: Gregory Gene Hortin, Henderson, KY (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/163,254

(22) Filed: May 24, 2016

(65) Prior Publication Data

US 2016/0264395 A1 Sep. 15, 2016

Related U.S. Application Data

(63) Continuation of application No. 14/635,342, filed on Mar. 2, 2015, now Pat. No. 9,365,406, which is a continuation of application No. 12/915,094, filed on Oct. 29, 2010, now Pat. No. 9,020,635.

(51) Int. Cl.
| | |
|---|---|
| *B67D 1/08* | (2006.01) |
| *B67D 1/00* | (2006.01) |
| *F25D 23/02* | (2006.01) |
| *G06Q 30/06* | (2012.01) |
| *G06F 3/0484* | (2013.01) |

(52) U.S. Cl.
CPC .......... *B67D 1/0888* (2013.01); *B67D 1/004* (2013.01); *B67D 1/0889* (2013.01); *F25D 23/028* (2013.01); *G06F 3/0484* (2013.01); *G06Q 30/0631* (2013.01)

(58) Field of Classification Search
CPC ....... B67D 1/088; B67D 1/004; B67D 1/0889; F25D 23/023; F25D 23/028; G06F 3/0484; G06Q 30/0631
USPC ........................................................ 700/233
See application file for complete search history.

(56) References Cited

U.S. PATENT DOCUMENTS

| | | | |
|---|---|---|---|
| 2,204,259 A | 6/1940 | Schuster et al. | |
| 2,356,381 A | 8/1944 | Christensen | |
| 6,711,465 B2 | 3/2004 | Tomassi | |
| 6,751,525 B1 * | 6/2004 | Crisp, III | B67D 1/0057 222/25 |
| 6,799,085 B1 | 9/2004 | Crisp, III | |
| 6,986,263 B2 | 1/2006 | Crisp, III | |
| 7,032,780 B2 | 4/2006 | Crisp, III | |
| 7,203,572 B2 | 4/2007 | Crisp, III | |
| 7,204,259 B2 | 4/2007 | Crisp, III | |
| 7,356,381 B2 | 4/2008 | Crisp, III | |
| 7,418,969 B1 | 9/2008 | Crisp, III | |

(Continued)

FOREIGN PATENT DOCUMENTS

WO 2005111955 A1 11/2005

*Primary Examiner* — Tho V Duong
*Assistant Examiner* — Raheena Rehman

(57) ABSTRACT

A refrigerator includes a cabinet, a first compartment, a second compartment, a first door providing access to the first compartment, a second door providing access to the second compartment, and a beverage dispensing system operatively connected the cabinet. The refrigerator further includes a user interface operatively connected to the cabinet, the user interface having a display and being configured to identify a user of the beverage dispensing system and customize beverage settings and preferences associated with the user.

20 Claims, 7 Drawing Sheets

(56) References Cited

U.S. PATENT DOCUMENTS

| | | |
|---|---|---|
| 7,484,388 B2 | 2/2009 | Crisp, III |
| 7,756,604 B1 | 7/2010 | Davis et al. |
| 7,899,713 B2 | 3/2011 | Rothschild |
| 8,279,042 B2 | 10/2012 | Beenau et al. |
| 2003/0191558 A1 | 10/2003 | Arellano |
| 2004/0215521 A1 | 10/2004 | Crisp, III |
| 2005/0033646 A1 | 2/2005 | Crisp, III |
| 2005/0033647 A1 | 2/2005 | Crisp, III |
| 2005/0050367 A1 | 3/2005 | Burger et al. |
| 2005/0178144 A1* | 8/2005 | Crisp .................. B67D 1/0057 62/389 |
| 2006/0080993 A1 | 4/2006 | Mullen |
| 2006/0104485 A1 | 5/2006 | Miller, Jr. |
| 2007/0215239 A1* | 9/2007 | Dorney .............. A47G 19/2227 141/94 |
| 2008/0021840 A1 | 1/2008 | Beenau et al. |
| 2008/0077274 A1 | 3/2008 | Kim |
| 2008/0264092 A1* | 10/2008 | Chase et al. ......... B67D 1/0858 62/389 |
| 2009/0070234 A1 | 3/2009 | Peters |
| 2009/0205747 A1* | 8/2009 | Lillard, Jr. ........... B67D 1/0888 141/94 |
| 2011/0126555 A1 | 6/2011 | Lee |
| 2012/0138629 A1* | 6/2012 | Ashrafzadeh et al. .................... B67D 1/0858 222/1 |

\* cited by examiner

BEVERAGE DISPENSING SYSTEM WITH USER CUSTOMIZABLE INPUTS

CROSS REFERENCE TO RELATED APPLICATIONS

This is a Continuation Application of and claims benefit to U.S. application Ser. No. 14/635,342, entitled "BEVERAGE DISPENSING SYSTEM WITH USER CUSTOMIZABLE INPUTS," filed on Mar. 2, 2015, which is pending, which is a Continuation Application of and claims benefit to U.S. application Ser. No. 12/915,094, entitled "BEVERAGE DISPENSING SYSTEM WITH USER CUSTOMIZABLE INPUTS," filed on Oct. 29, 2010, now granted as U.S. Pat. No. 9,020,635, the entire disclosures of which are both expressly incorporated herein by reference.

FIELD OF THE INVENTION

The present invention relates to beverage dispensing. More specifically, but not exclusively, the present invention relates to a beverage dispensing method and device that allows the user to customize their beverage settings and preferences.

BACKGROUND OF THE INVENTION

Consumers that desire a certain beverage are required to purchase, store, retrieve, or prepare the beverage to meet their taste. For example, pre-packaged beverages (such as beverages packaged in cans or bottles) may create storage space issues and issues with transportation. Where beverages are prepared by the consumer, there is the attendant inconvenience of preparing the beverage. In recent years, consumers are turning to single serve pods/cartridges to deliver their hot or even cold beverages through countertop or water cooler based systems. These pods typically may contain a powder, concentrate, or grounds that mix with a fluid to create the beverage. There are examples of current countertop systems that detect the type of pod or cartridge and configure the system accordingly. However, the use of such systems may limit the ability of a consumer to prepare beverages which match their taste. Even where such systems allow a consumer to adjust parameters affecting taste, doing so may be inconvenient and where multiple users are using the same beverage dispensing system may require each user to modify settings before each use. What is needed is a beverage dispensing system which assists users in preparing beverages according to their individual tastes in a way that is convenient to the users.

BRIEF SUMMARY OF THE INVENTION

According to one aspect of the present invention, a refrigerator is provided. The refrigerator includes a cabinet, a first compartment, a second compartment, a first door providing access to the first compartment, a second door providing access to the second compartment, and a beverage dispensing system operatively connected the cabinet. The refrigerator further includes a user interface operatively connected to the cabinet, the user interface having a display and being configured to identify a user of the beverage dispensing system and customize beverage settings and preferences associated with the user.

According to another aspect of the present invention, a refrigerator includes a cabinet, a fresh food compartment disposed within the cabinet, a freezer compartment disposed within the cabinet, a fresh food compartment door providing access to the fresh food compartment and a freezer compartment door providing access to the freezer compartment. The refrigerator further includes a beverage dispensing system disposed operatively connected to the cabinet, the beverage dispensing system configured to prepare a beverage using a liquid enhancement component and a user interface electrically connected to the beverage dispensing system, the user interface having a display and being configured to identify a user of the beverage dispensing system.

DETAILED DESCRIPTION OF THE PREFERRED EMBODIMENTS

Figure 1:
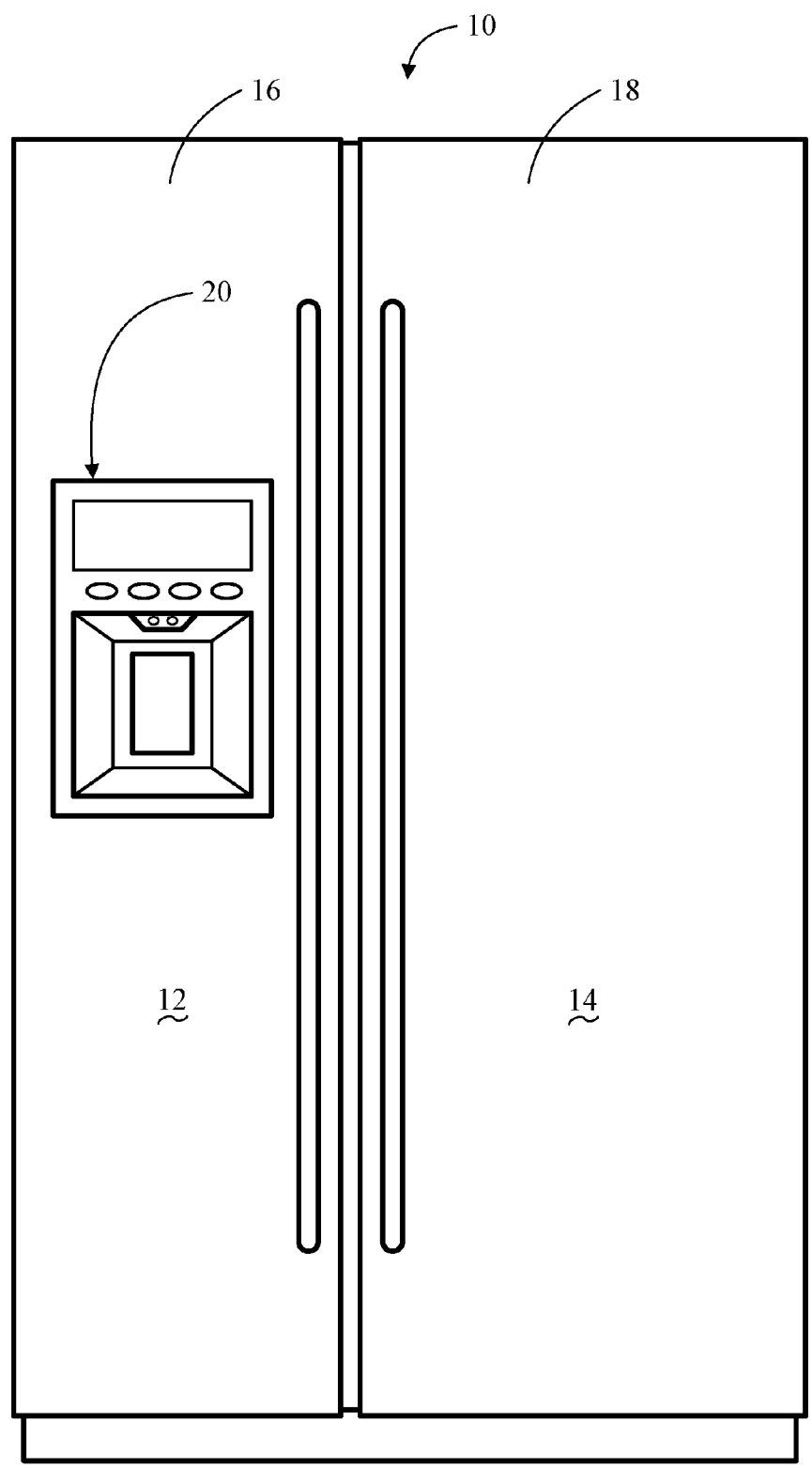
FIG. 1 illustrates a beverage dispensing integrated in a refrigerator.

FIG. 1 illustrates a refrigerator 10 having a fresh food compartment 14 and a freezer compartment 12. The fresh food compartment 14 has a door 18 and the freezer compartment 12 has a door 16. The refrigerator 10 includes a beverage dispensing system 20 which is shown in the door 16. As shown in FIG. 1, the refrigerator 10 is shown in a side-by-side configuration. Of course, the refrigerator 10 may take on other configurations as well, such as a bottom mount freezer configuration.

Figure 2:
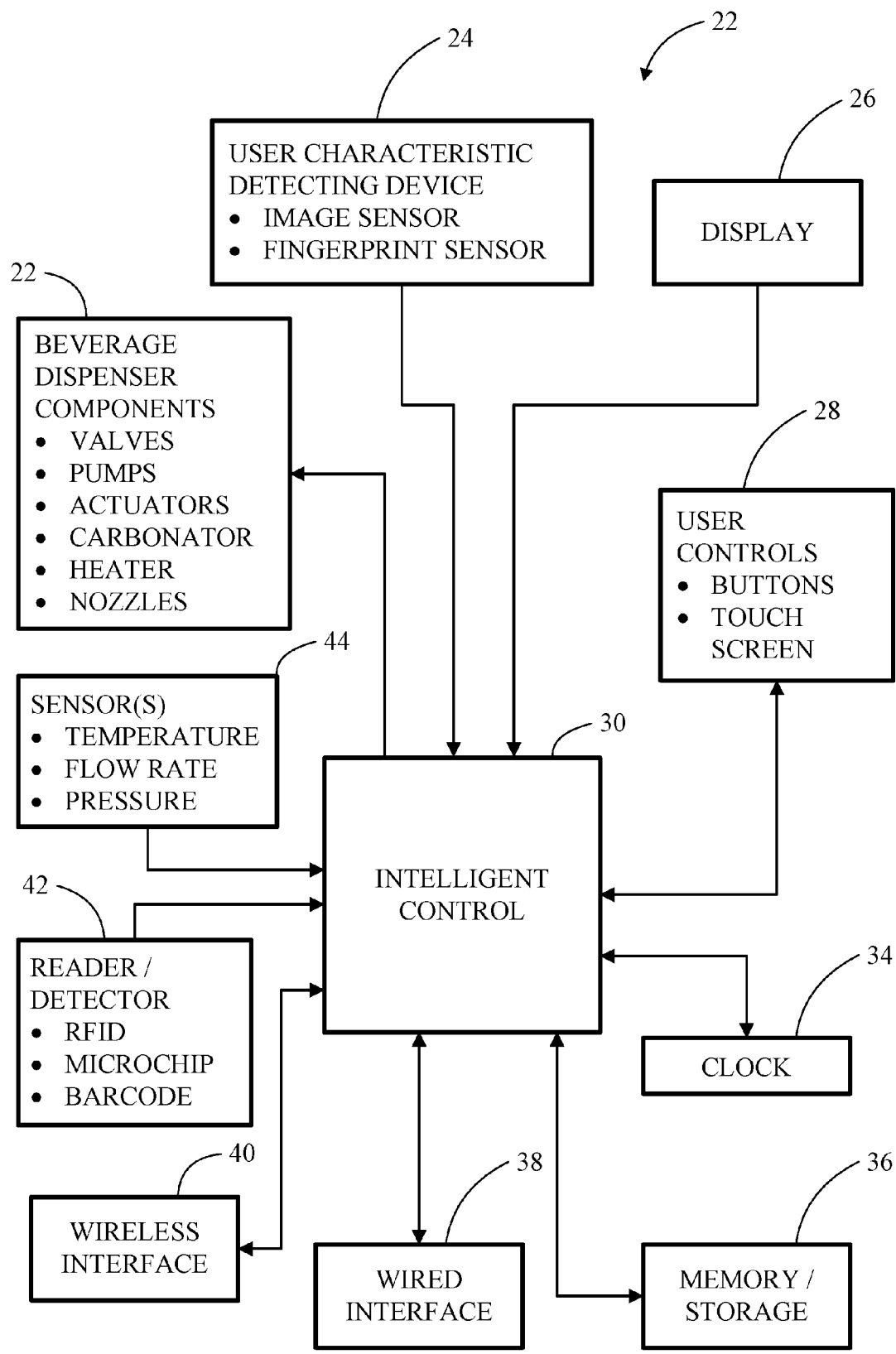
FIG. 2 illustrates a block diagram representation of a beverage dispensing system.

FIG. 2 illustrates a block diagram representation of a beverage dispensing system 20. The beverage dispensing system 20 may include beverage dispenser components 22. The beverage dispenser components 22 may include valve(s), pump(s), actuator(s), carbonator(s), heater(s) and nozzle(s) to allow the chosen beverage (colas, sparkling water, iced tea, lemonade, fruit punch, hot chocolate, hot tea, coffee, milk, water, hot water, etc.) to dispense into a consumer's chosen container (cup, glass, mug, etc.). The beverage dispensing system 20 may also dispense ice cubes and or crushed ices.

Another component of the beverage dispensing system 20 is an user characteristic detecting device 24 which may be integral to the beverage dispensing system 20 or may be mounted in any convenient location on the door 16 or otherwise. The characteristic detecting device 24 may be an image sensor which may be a device that converts an optical image to an electric signal. The image sensor may be a charge-coupled device (CCD) or a complementary metal-oxide semiconductor (CMOS) active-pixel sensor, or other type of image sensor or camera. The characteristic detecting device 24 may also be a fingerprint sensor or other type of device for use in identifying a user.

Another component of the beverage dispensing system 20 is a display 26. The display 26 may display images or symbols which represent the state of the refrigerator, such as fresh food temperature, freezer temperature, beverage dispenser functions and recognition of the present user. The display 26 may be a touch screen display.

Another component of the beverage dispensing system 20 are user controls 28. The user controls 28 may include controls such as buttons, touch screen display inputs, sliders or switches, which enable a user to select a preferred dispensing operation or selected other settings.

Another component of the beverage dispensing system 20 is a clock 34. Although shown as a separate component, the clock may also be integrated into the intelligent control 30. The clock 34 allows for maintaining time and date information.

A memory/storage device 36 is also shown operatively connected to the intelligent control 30. The memory/storage device 36 may be used to store individual user information. The memory/storage device 36 may be a machine readable storage medium.

The beverage dispensing system 20 may include a wired interface 38. The interface may be a sim card interface, USB interface, memory card interface, or other type of interface suitable for interfacing with a removable device or memory. The removable device may be used to store individual user information and beverage usage patterns. The beverage usage patterns may be daily, weekly, monthly, yearly or for any other period of time.

The beverage dispensing system 20 may also include a wireless interface 40. The wireless interface 40 may be used to communicate with a computer network and/or cellular network, or other types of wireless networks.

The beverage dispensing system 20 may also include a reader/detector 42. The reader/detector 42 may be a radio-frequency identification (RFID) system, a microchip based system or a barcode system. A Radio-frequency identification (RFID) tag or a barcode may be affixed to the user's beverage container or a microchip may be embedded within the user's beverage container for the purpose of identifying a particular beverage container. As will be discussed later herein the beverage container may be associated with a particular user or type of beverage.

The beverage dispensing system 20 may also include sensors 44. The sensors 44 may include temperature sensors, flow rate sensors, and/or pressure sensors to assist in allowing the chosen beverage to be dispensed properly and consistently. The sensors 44 may also include contact sensors or other sensor used to determine the state of various components within the beverage dispensing system 20.

The beverage dispensing system 20 may include an intelligent control 30. The intelligent control 30 may function as a main controller for the refrigerator, including the functions provided by the beverage dispensing 20 as well as other operations. The intelligent control 30 may be a microcontroller, microprocessor, or other type of intelligent control. The intelligent control 30 is electrically connected to the beverage dispenser components 22, the user characteristic detecting device 24, the display 26, the user controls 28, the clock 34, the memory/storage device 36, the wired interface 38, the wireless interface 40, the reader/detector 42 and the sensors 44.

Figure 3:
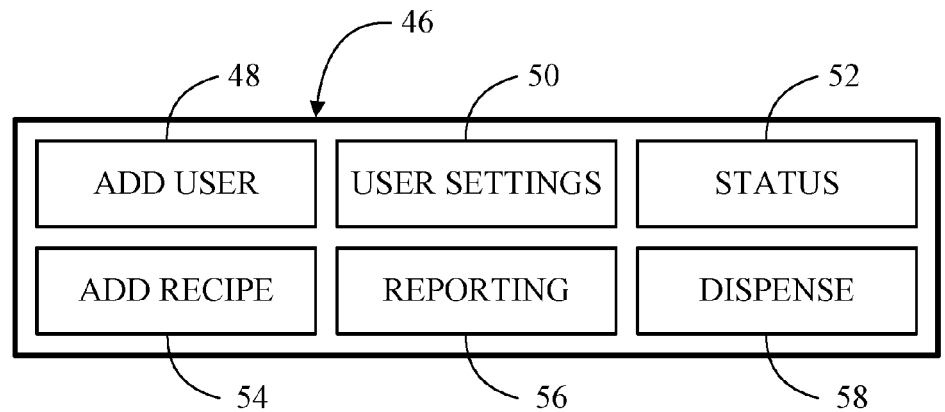
FIG. 3 is an illustration of an example of a "main menu" screen display accessible to the user.

FIG. 3 illustrates a main menu 46 screen display which may be seen on the display 26. The main menu screen display 46 may allow a user to access the add user screen display by selecting button 48, the user settings screen display by selecting button 50, the beverage usage and status screen display by selecting button 52, the add recipe screen display by selecting button 54, the refrigerator component and system reporting screen display by selecting button 56 and the beverage dispenser screen display by selecting button 58. The main menu screen display 46 is merely one example of a screen display that may be used by a user to perform various functions associated with the beverage dispensing system 20.

Figure 4:
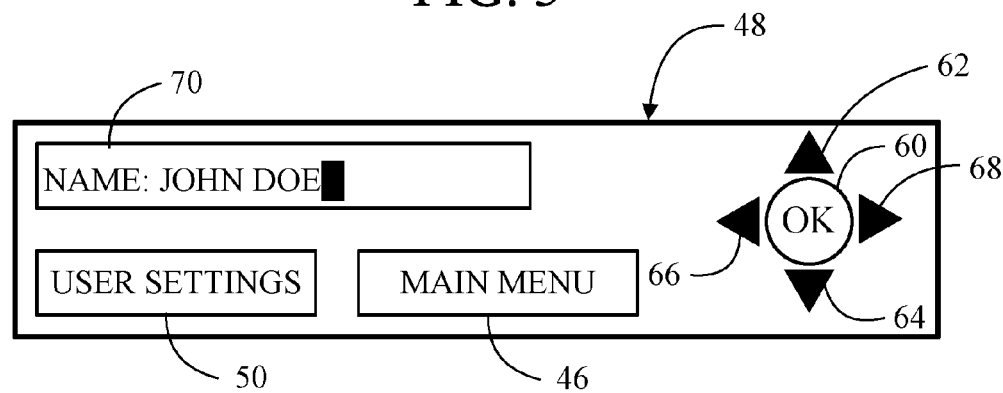
FIG. 4 is an illustrations of an example of an "add user" screen display.

FIG. 4 illustrates the add user screen display 48 which may be seen on the display 26. The add user screen display 48 may include a new user input field 70. The add user screen display 48 may also include an up arrow 62, a down arrow 64, a left arrow 66, a right arrow 68 and an OK button 60. The up arrow 62 and down arrow 64 allow the user to scroll through an alphanumeric alphabet, both uppercase and lowercase to select each letter and number. The OK button 60 confirms each letter or number choice. The left arrow 66 and the right arrow 68 allow the user to move left or right within the input field 70. The add user screen display 48 may also include a user settings button 50 and a main menu button 46 to allow the user to quickly jump to those screen displays.

Figure 5:
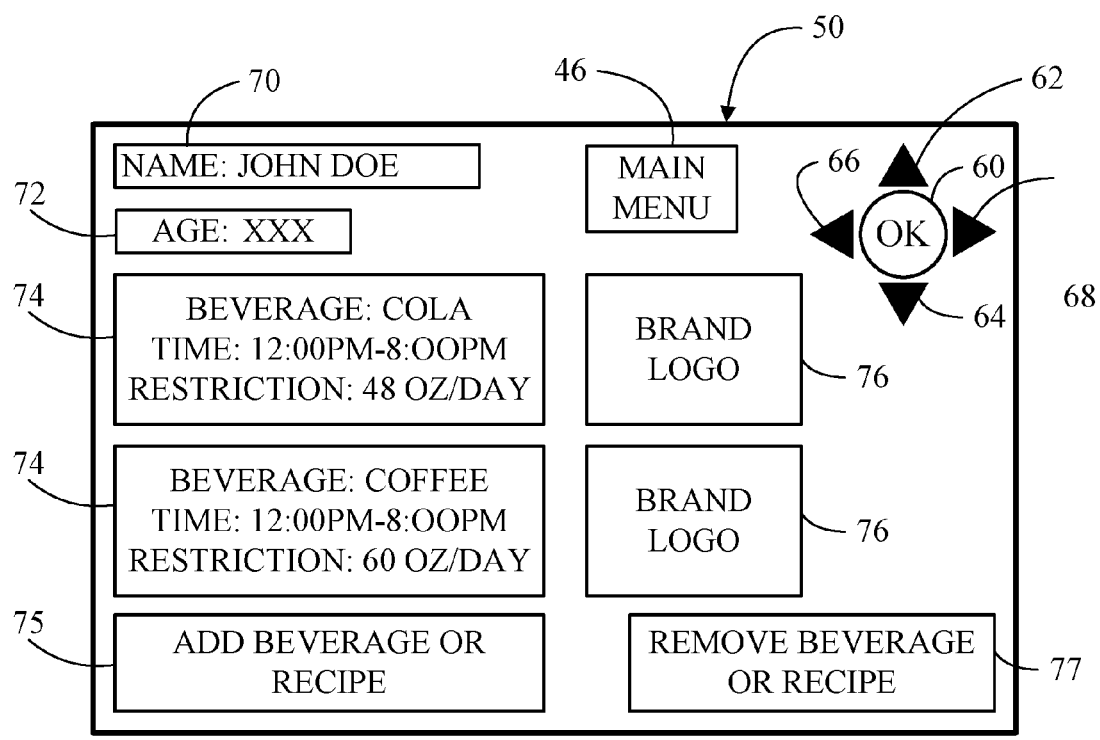
FIG. 5 is an illustration of an example of a "user settings" screen display accessible to the user.

FIG. 5 illustrates the user settings screen display 50 which may be seen on the display 26. The user settings screen display 50 may include a new user input field 70. The user settings screen display 50 may include a user age input field 72. The user age input filed 72 may be utilized to prevent children from accessing hot beverages. The user settings screen display 50 may include a beverage input field 74. The beverage input field 74 allows each user to choose a preferred beverage, to choose a preferred time period and restrictions related to the preferred beverage. The user settings screen display 50 may include a brandable logo 76 to be associated with a preferred beverage. The user settings screen display 50 may also include an up arrow 62, a down arrow 64, a left arrow 66, a right arrow 68 and an OK button 60. The up arrow 62 and down arrow 64 allow the user to scroll through an alphanumeric alphabet, both uppercase and lowercase, to select each letter and number. The OK button 60 confirms each letter or number choice. The left arrow 66 and the right arrow 68 allow the user to move left or right within the input field 70. The user settings screen display 50 may also include a add beverage or recipe button 75, a remove beverage or recipe button 77 and a main menu button 46. The add beverage or recipe button 75 allows the user to add multiple preferred beverages or recipes. The remove beverage or recipe button 77 allows the user to remove multiple preferred beverages or recipes which are no longer preferred or available. The main menu button 46 allows the user to quickly go back to the main menu.

Figure 6:
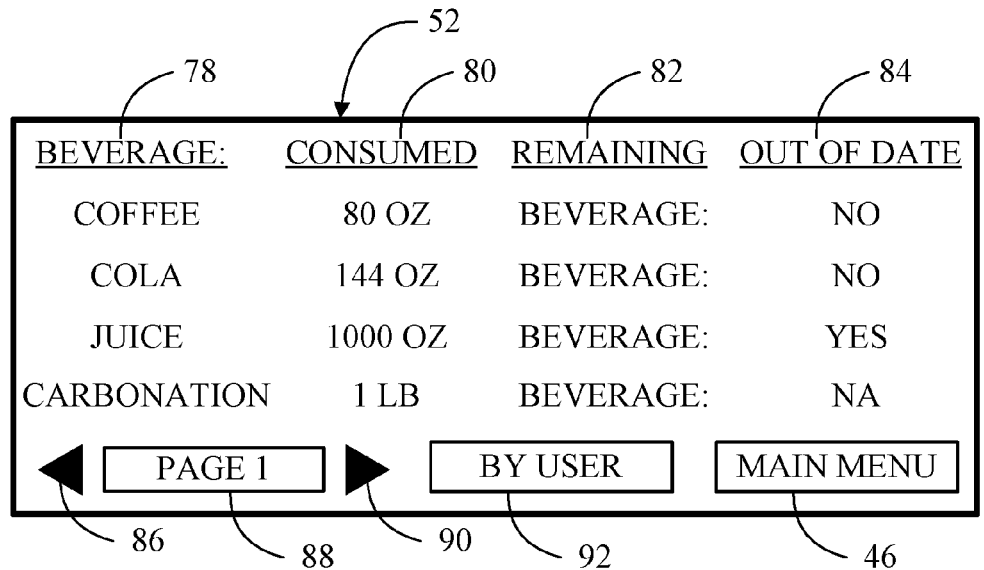
FIG. 6 is an illustration of an example of a "beverage usage and status" screen display accessible to the user.

FIG. 6 illustrates a beverage usage and status screen display 52 which may be seen on the display 26. The beverage usage and status screen display 52 may include the following column headings: beverage 78, consumed 80, remaining 82 and out of date 84. The column heading "beverage" 78 names the particular beverage or fluid enhancement component. The heading "consumed" 80 reflects the amount of each beverage or fluid enhancement component consumed. The heading "remaining" 82 reflects the amount of each beverage or fluid enhancement component remaining. The heading "out of date" 84 reflects the freshness of each beverage or fluid enhancement component. The page left 86 and page right 90 arrows allow the user to scroll through multiples of pages for easy viewing. The by user 92 button allows the user to jump to the user beverage usage and status screen display 92 for viewing individual user usage and status. The main menu button 46 allows the user to quickly go back to the main menu.

Figure 7:
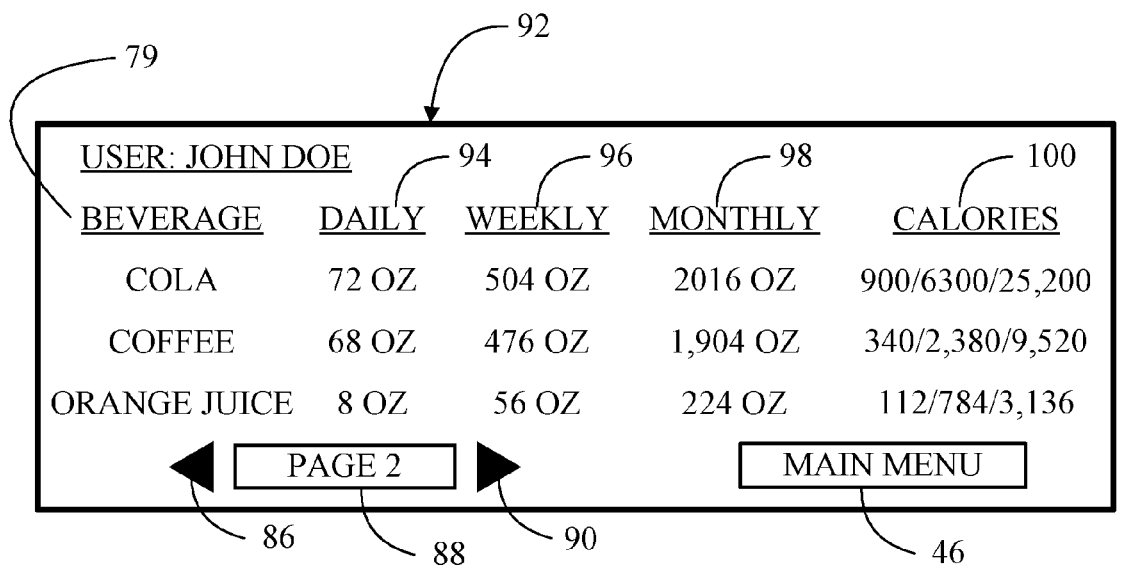
FIG. 7 is an illustration of an example of a "beverage usage and status" screen display for an individual user.

FIG. 7 illustrates a user beverage usage and status screen display 92 which may be seen on the display 26. The individual beverage usage and status screen display 92 may include the following column headings: beverage 79, daily, 94, weekly, 96, monthly 98 and calories 100. The daily 94 column may relate the total volume of beverage 79 per day. The weekly 96 column may relate the total volume of beverage 79 per week. The monthly 98 column may relate the total volume of beverage 79 per month. The calories 100 column may relate the total calories of beverage 79 per day, week or month. The page left 86 and page right 90 arrows allow the user to scroll through multiples of pages for easy viewing. The main menu button 46 allows the user to quickly go back to the main menu.

Figure 8:
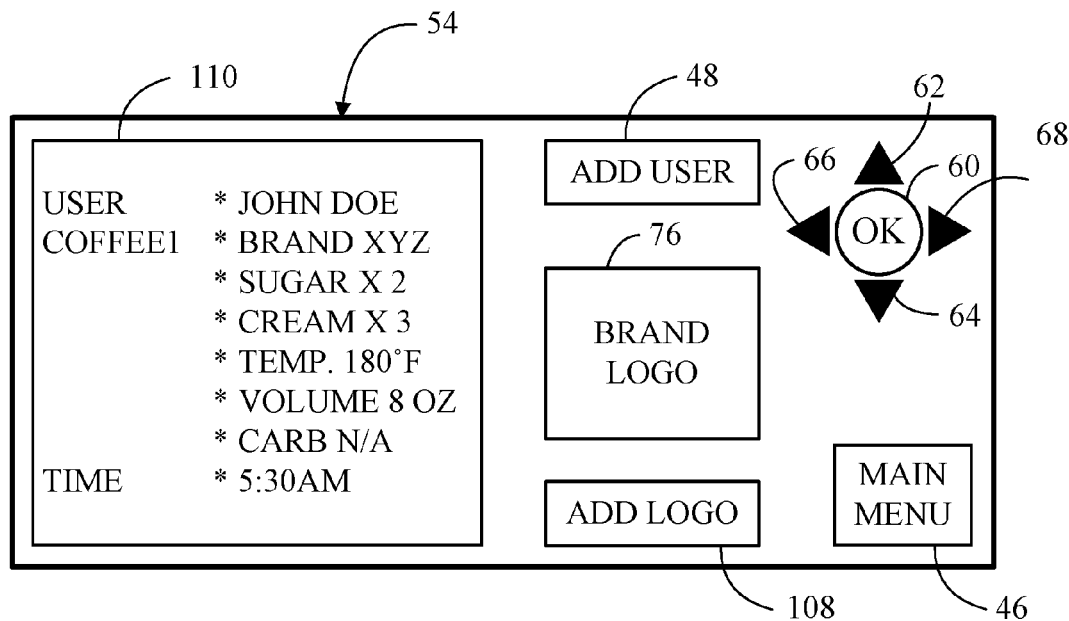
FIG. 8 is an illustration of an example of an "add recipe" screen display accessible to the user.

FIG. 8 illustrates the add recipe screen display 54 which may be seen on the display 26. The add recipe screen display 54 may include a user preference input field 110. The user preference input field 110 may have fields to input beverage brand, sweetener brand, dairy brand, beverage temperature, beverage volume, i.e., 8 oz. or 12 oz. The input field 110 may also for carbonation and the time of day to dispense. The add recipe screen display 54 may also include an up arrow 62, a down arrow 64, a left arrow 66, a right arrow 68 and an OK button 60. The up arrow 62 and down arrow 64 allow the user to scroll through an alphanumeric alphabet within the user preference input field 110 to select each letter and number (both uppercase and lowercase letters). The OK button 60 confirms each letter or number choice. The left arrow 66 and the right arrow 68 allow the user to move left or right within the input field 70. The add recipe screen display 54 may also include a add user button 48 and a main menu button 46 to allow the user to quickly jump to those screen displays. The add recipe screen display 54 may include an add logo 108 button. The add logo 108 button may jump to a logo selection screen display 109 wherein the user may select from logos residing within memory/storage 36.

Figure 9:
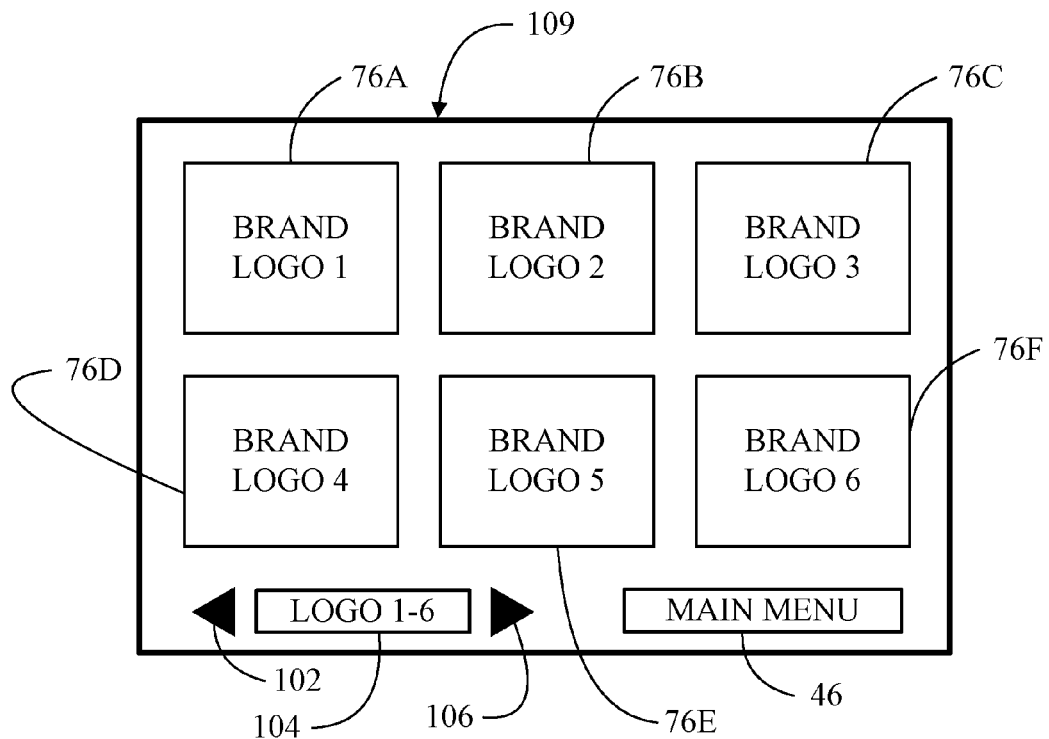
FIG. 9 is an illustration of an example of a "brandable logos" screen display accessible to the user.

FIG. 9 illustrates a brandable logo screen display 109 which may be seen on the display 26. The brandable logo screen display 109 may show logos 76A-F associated with beverage or fluid enhancement consumable within the beverage dispensing system 20 or may show all logos 76A-F which are associated with any beverage or fluid enhancement consumable available for use within the beverage dispensing system 20. The brandable logo screen display 109 may include a logo left arrow 102 and a logo right arrow 106 which allows the user to scroll through all available logos 104. The main menu button 46 allows the user to quickly go back to the main menu.

Figure 10:
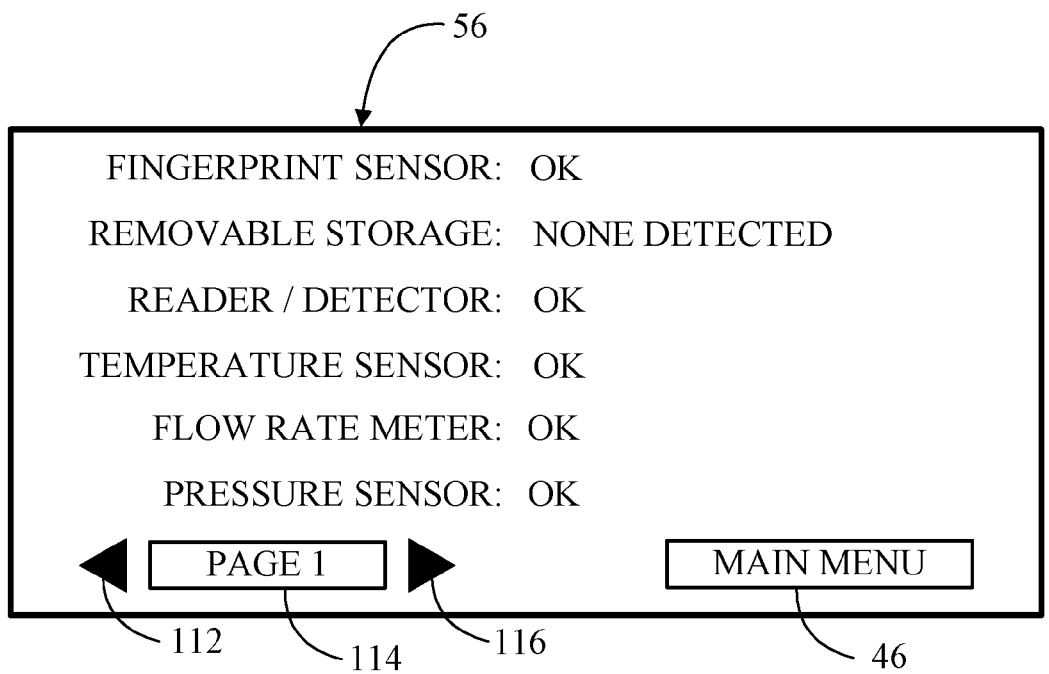
FIG. 10 is an illustration of an example of a "refrigerator component and sub-systems reporting" screen display accessible to the user.
Figure 11:
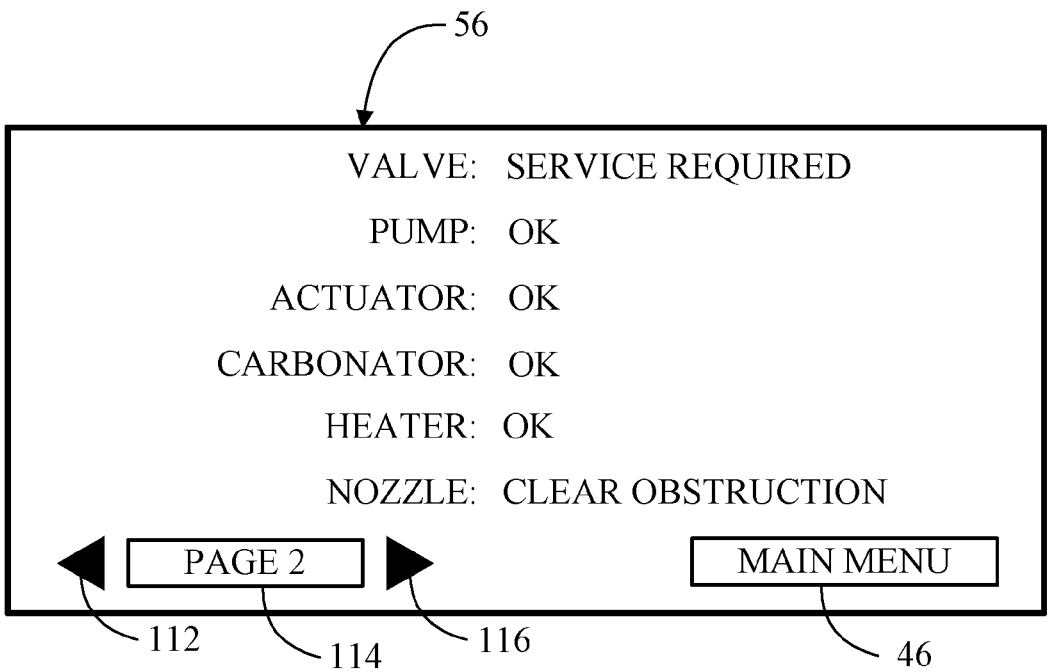
FIG. 11 is an illustration of another example of a "refrigerator component and sub-systems reporting" screen display accessible to the user.

FIG. 10-11 each illustrate separate pages for the refrigerator component and sub-systems reporting screen display 56 which may be seen on the display 26. The refrigerator component and sub-systems reporting screen display 56 may include the beverage dispenser components 22, the user characteristic detecting device 24, the display 26, the clock 34, the memory/storage 36, the wireless interface 40, the reader/detector 42 and the sensor(s) 44. The refrigerator component and sub-systems reporting screen display 56 may include a page left arrow 112 and a page right arrow 116 which allows the user to scroll through all available pages 114. The main menu button 46 allows the user to quickly go back to the main menu.

Figure 12:
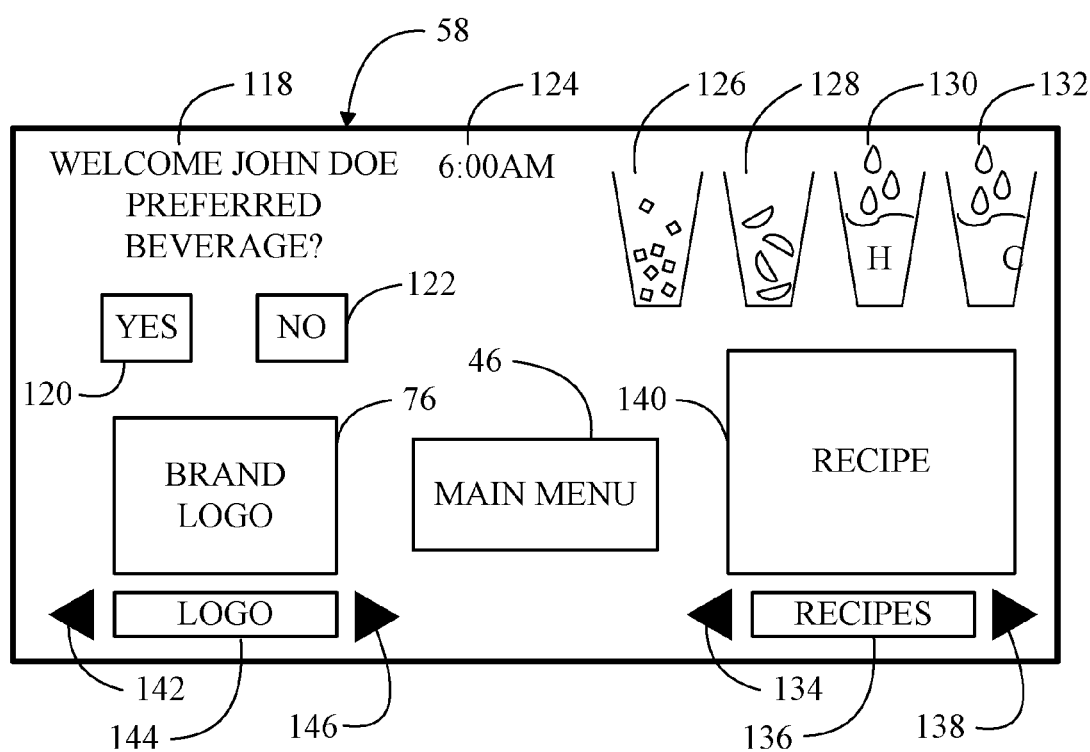
FIG. 12 is an illustration of an example of a "beverage dispensing" screen display accessible to the user.

FIG. 12 illustrates the beverage dispenser screen display 58 which may be seen on the display 26. The beverage dispenser screen display 58 may include an interactive welcome message 118 based on the user characteristic detection device 24. The interactive welcome message 118 may include a yes 120 button and a no 122 button. By pressing the yes 120 button the beverage dispenser shall dispense a beverage based on the user settings screen display 50. By pressing the no 120 button the user may have multiple dispensing choices. The user may select crushed ice 126, cubed ice 128, hot water 130 and cold water 132 or any combination thereof. The user may select a beverage by brandable logo 76. The user may view a brandable logo 76 by pressing the logo left arrow 122 or the logo right arrow 126. The brandable logo 76 may be selected by pressing logo indicator 124. The user may also select a beverage by recipe 140. The user may view a recipe 140 by pressing the left recipe arrow 134 or the right recipe arrow 138. The user may then select a recipe 140 by pressing recipe indicator 136. The main menu button 46 allows the user to quickly go back to the main menu.

EXAMPLE 1

The beverage dispensing system 20 may de-activate the hot water from dispensing when children are using the beverage dispenser components 22. Thus in this example, the beverage dispensing system 20 provides a safe and optimized usage experience of the beverage dispenser components 22 which may prevent a child from being burned or scalded by the hot water. To do so, the user characteristic detecting device 24 may acquire an image of the user and determine that the user is a child. One way of doing so is to compare an image of the user with images within a database to determine a match and to then access data associated within the image indicating that the user is a child. The user characteristic detecting device 24 may also acquire a fingerprint of the user and determine that the user is a child. One way of doing so is to compare a fingerprint of the user with fingerprints within a database to determine a match and to then access data associated within the fingerprint indicating that the user is a child.

EXAMPLE 2

The beverage dispensing system 20 may be programmed to prevent children from drinking too much of a specific type of beverage. Thus in this example, the beverage dispensing system 20 may limit a child to four caffeinated drinks per day, or no more than one caffeinated drink per hour. Additionally the beverage dispensing system may not allow the child to have caffeinated beverages after a certain hour. The beverage dispensing system 20 may then prevent a child from over indulging in a beverage which may cause them to become over caffeinated and they are therefore provided a safe and optimized beverage dispensing usage experience. To do so, the user characteristic detecting device 24 may acquire an image of the user and determine that the user is a child. One way of doing so is to compare an image of the user with images within a database to determine a match and to then access data associated within the image indicating that the user is a child. The user characteristic detecting device 24 may also acquire a fingerprint of the user and determine that the user is a child. One way of doing so is to compare a fingerprint of the user with fingerprints within a database to determine a match and to then access data associated within the fingerprint indicating that the user is a child.

EXAMPLE 3

The beverage dispensing system 20 may prepare a given drink that the consumer uses on a regular basis. Thus in this example, the beverage dispensing system 20 may provide coffee or juice in the morning, cola throughout the day. The user places their beverage container into the beverage dispenser components 22 and receives their preferred beverage without the need to make any decisions and they are therefore provided a safe and optimized beverage dispensing usage experience. To do so, the user characteristic detecting device 24 may acquire an image of the user and determine the identity of that the user. One way of doing so is to compare an image of the user with images within a database to determine a match and to then access data associated within the image indicating that specific user. The user characteristic detecting device 24 may also acquire a fingerprint of the user and determine that the user. One way of doing so is to compare a fingerprint of the user with fingerprints within a database to determine a match and to then access data associated within the fingerprint indicating that the user.

EXAMPLE 4

The beverage dispensing system 20 may recognize a type of container, such as a mug or a specific glass. Thus in this example, the beverage dispensing system 20 may recommend via the user interface a beverage that matches the container type or automatically dispense a beverage that matched the container type. To do so, the user characteristic detecting device 24 may acquire an image of the container and determine the type of container. One way of doing so is to compare an image of the container with images within a database to determine a match and to then access data associated within the image indicating that specific container type. The user may then place their beverage container into the beverage dispenser components 22 and receive their preferred beverage and they are therefore provided a safe and optimized beverage dispensing usage experience.

EXAMPLE 5

The beverage dispensing system 20 may display branded logos, refer to FIG. 7. Thus in this example, the beverage dispensing system 20 may utilize brandable logos for the user to make their beverage dispensing decisions. To do so, the user characteristic detecting device 24 may acquire an image of the user and determine the users preferred beverages and then display a plurality of branded logos. One way of doing so is to compare an image of the user with images within a database to determine a match and to then access data associated within the image indicating that user. The user may then place their beverage container into the beverage dispenser components 22 and receive their chosen beverage and they are therefore provided a safe and optimized beverage dispensing usage experience.

EXAMPLE 6

The beverage dispensing system 20 may display the status of the beverage dispensing system 20, refer to FIG. 6A-C.

Thus in this example, the beverage dispensing system 20 gives the user important information graphically, iconically and/or textually to the real-time operation of the system via the display 26. The information may include the plurality of beverage dispenser components 22, the user characteristic detecting device 24, the reader/detector 42, etc. Also, the beverage dispensing system 20 may presently be brewing a beverage, or carbonating a beverage, etc. As these processes occur internally they are not visible to the user, the beverage dispensing system 20 may inform to its state via the display 26. The beverage dispensing system 20 may also notify the user of the need to replace a beverage which is now empty or its expiration date has expired, or indicate how much fluid or beverage enhancement is available (such as many unused pods are available in pod-systems) or otherwise provide an inventory of fluid enhancement components. To do so, the intelligent control 30 may query and acquire the status of the various beverage dispenser components 22, the user characteristic detecting device 24, the display 26, the user controls 28 the memory/storage 34, the clock 34, the memory/storage device 36, the wired interface 38, the wireless interface 40, the reader/detector 42, and the sensors 44. One way of doing so is to compare the existing status of the various beverage dispenser components 22, the user characteristic detecting device 24, the display 26, the user controls 28 the memory/storage 36, the clock 34, the memory/storage device 36, the interface 38, the wireless interface 40, the reader/detector 42, and the sensors 44 with the present status of the various beverage dispenser components 22, the image sensor, the user controls 28 the memory/storage 36, the reader/detector 42 and the image processing component within a database to determine a change and to then to indicate that to the user via the display 26.

EXAMPLE 7

The beverage dispensing system 20 may also display drink information for each user for a given period of time, refer to FIG. 8. Thus in this example, the beverage dispensing system 20 gives the user important information such as nutritional or the total volume consumed for each beverage which they may use to adjust their consumption rates. The information may also be used to evaluate costs associated with each beverage over time.

EXAMPLE 8

The beverage dispensing system 20 may detect a user's container utilizing RFID tags. Thus in this example, the beverage dispensing system 20 recognizes the user based upon the container. To do so, the RFID reader/detector 42 may acquire the identifying information of the container from the RFID tag affixed to the container. One way of doing so is to compare the identifying information located in the RFID tag of the container with identifying information within a database to determine a match and to then access data associated within the identifying information indicating that the user. The system may associate a specific beverage based on the container. The system may also associate the container to a specific user and their beverage preferences. The user then places their beverage container into the beverage dispenser components 22 and is then provided a safe and optimized beverage dispensing usage experience.

EXAMPLE 9

The beverage dispensing system 20 may detect a user's container utilizing direct contact data communication via a microchip within the container, or other means. Thus in this example, the beverage dispensing system 20 recognizes the user based upon the container. To do so, the RFID reader/detector 42 may acquire the identifying information of the container from the microchip embedded within the container. One way of doing so is to compare the identifying information located in the microchip of the container with identifying information within a database to determine a match and to then access data associated within the identifying information indicating that the user. The system may associate a specific beverage based on the container. The system may also associate the container to a specific user and their beverage preferences. The user then places their beverage container into the beverage dispenser components 22 and is then provided a safe and optimized beverage dispensing usage experience.

EXAMPLE 10

The beverage dispensing system 20 recognizes the container and not the user. Thus in this example, the beverage dispensing system 20 recognizes the container visually as opposed to utilizing a RFID tag affixed to the container or a microchip embedded into the container. The system may associate a specific beverage based on the container. The system may also associate the container to a specific user and their beverage preferences. Thus in this example, the beverage dispensing system 20 may recommend via the user interface a beverage that matches the container type. To do so, the user characteristic detecting device 24 may acquire an image of the container and determine the type of container. One way of doing so is to compare an image of the container with images within a database to determine a match and to then access data associated within the image indicating that specific container type. The user may then place their beverage container into the beverage dispenser components 22 and receive their preferred beverage and they are therefore provided a safe and optimized beverage dispensing usage experience. The user then places their beverage container into the beverage dispenser components 22 and is then provided a safe and optimized beverage dispensing usage experience.

EXAMPLE 11

The beverage dispensing system 20 may limit caloric intake of the user for a given period of time. Thus in this example, the beverage dispensing system 20 prevents the user from dispensing any beverage once a caloric limit has been reached for the given period of time. To do so, the user characteristic detecting device 24 may acquire an image of the container and/or the user and determine the type of container and/or the user. One way of doing so is to compare an image of the container and/or the user with images within a database to determine a match and to then access data associated within the image indicating that specific container type and/or the user. The beverage dispensing system 20 may query the user regarding limiting caloric intake or the user may initiate limiting caloric intake via the user interface 36. The user may limit their caloric intake to 1000 calories a day or any other caloric value or time period. The user may then place their beverage container into the beverage dispenser components 22 and receive their preferred beverage and they are therefore provided a safe and optimized beverage dispensing usage experience.

EXAMPLE 12

The beverage dispensing system 20 may limit drink selections of the user. Thus in this example, the beverage dispensing system 20 prevents the user from dispensing certain beverages, such as sugary or caffeinated beverages, etc. To do so, the user characteristic detecting device 24 may acquire an image of the container and/or the user and determine the type of container and/or the user. One way of doing so is to compare an image of the container and/or the user with images within a database to determine a match and to then access data associated within the image indicating that specific container type and/or the user. The beverage dispensing system 20 may query the user regarding limiting caloric intake or the user may initiate limiting caloric intake via the user interface 36. The user may limit their caloric intake to 1000 calories a day or any other caloric value or time period. The user may then place their beverage container into the beverage dispenser components 22 and receive their preferred beverage and they are therefore provided a safe and optimized beverage dispensing usage experience.

EXAMPLE 13

The beverage dispensing system 20 may inform the user of their beverage usage. Thus in this example, the beverage dispensing system 20 informs the user of their beverage usage via the display 26 for monitoring dietary intake. The information may include total beverages, total volume and total calories for a day, a week, a month or any length of time. The beverage dispensing system 20 may query the user regarding displaying the information or the information may be displayed as a normal operating function of the beverage dispensing system 20. To do so, the user characteristic detecting device 24 may acquire an image of the user and determine the user. One way of doing so is to compare an image of the user with images within a database to determine a match and to then access data associated within the image indicating the user and then displaying the beverage usage.

EXAMPLE 14

The beverage dispensing system 20 may inform the user of their beverage usage. Thus in this example, the beverage dispensing system 20 informs the user of their beverage usage via the display 26 to assist with inventory management. The information may include total beverage usage for a day, a week, a month or any length of time. The beverage dispensing system 20 may query the user regarding displaying the information or the information may be displayed as a normal operating function of the beverage dispensing system 20. To do so, the user characteristic detecting device 24 may acquire an image of the user and determine the user. One way of doing so is to compare an image of the user with images within a database to determine a match and to then access data associated within the image indicating the user and then displaying the beverage inventory levels.

EXAMPLE 15

The beverage dispensing system 20 recognizes indicia on the container. Thus in this example, the beverage dispensing system 20 may recommend via the user interface a beverage that matches the container indicia or automatically dispense a beverage that matched the container indicia. To do so, the user characteristic detecting device 24 may acquire an image of the container indicia and determine the indicia on the container. One way of doing so is to compare an image of the container indicia with images within a database to determine a match and to then access data associated within the image indicating that specific container indicia. The user may then place their beverage container into the beverage dispenser components 22 and receive their preferred beverage and they are therefore provided a safe and optimized beverage dispensing usage experience.

The invention has been shown and described above with respect to various aspects and embodiments, and it is understood that many modifications, substitutions, and additions may be made which are within the intended spirit and scope of the invention. For example, the present invention contemplates numerous variations with respect to the types of sensors used, the user interface used, the method in which users are identified, the methods in which users specify preferences, and other variations, options, and alternatives. The present invention is not to be limited to any specific embodiment described herein or combinations thereof.

What is claimed is:

1. A beverage dispenser comprising:
    a cabinet;
    a user interface disposed on the cabinet and comprising an input portion and a display portion;
    a wireless interface in electrical communication with the user interface; and
    a dispenser having a nozzle, the nozzle being in liquid communication with a conduit with least one beverage to be dispensed;
    wherein the wireless interface detects a user characteristic of a user of the beverage dispenser and electrically communicates the user characteristic to the user interface; and
    wherein the user interface automatically and without user action or input displays on the display portion a recommended beverage to be dispensed to a user of the beverage dispenser based on the detected user characteristic.

2. The beverage dispenser of claim 1, wherein wireless interface comprises a cellular network communication.

3. The beverage dispenser of claim 1, wherein the wireless interface comprises a RFID sensor.

4. The beverage dispenser of claim 1, wherein the wireless interface comprises an optical sensor.

5. The beverage dispenser of claim 4, wherein the optical sensor comprises a charge-coupled device or a complementary metal-oxide semiconductor device.

6. The beverage dispenser of claim 1, wherein the beverage dispenser is disposed within a door of a refrigerator.

7. The beverage dispenser of claim 6, wherein the refrigerator further comprises an ice dispenser.

8. The beverage dispenser of claim 1, wherein the user interface is configured to store usage data based on the detected user characteristic.

9. The beverage dispenser of claim 8, wherein the usage data comprises historical user data, and the user interface displays beverage usage data of the user on the display portion.

10. The beverage dispenser of claim 1, wherein the user interface is configured to display restrictions associated with the user on the display portion.

11. A beverage dispensing system comprising:
    a beverage dispenser comprising a nozzle, the nozzle being in liquid communication with a conduit having at least one beverage to be dispensed;
    a user characteristic detecting device configured to wirelessly identify a user of the beverage dispensing system; and
    a user interface disposed at a location for a user to easily access, the user interface in electrical communication with the user characteristic detecting device;
    wherein the user characteristic detecting device electrically communicates the identified user to the user interface; and
    wherein the user interface automatically and without user action or input displays a recommended beverage to be dispensed to a user based on the identified user and customizes beverage settings and preferences associated with the user.

12. The beverage dispensing system of claim 11, wherein the characteristic detecting device comprises a cellular network communication.

13. The beverage dispensing system of claim 11, wherein the user characteristic detecting device comprises a RFID sensor.

14. The beverage dispensing system of claim 11, wherein the user characteristic detecting device comprises an optical sensor.

15. The beverage dispensing system of claim 14, wherein the optical sensor comprises a charge-coupled device or a complementary metal-oxide semiconductor device.

16. The beverage dispensing system of claim 11, wherein the user interface is configured to adjust customized beverage settings and preferences for the user at least partially based on time of day.

17. The beverage dispensing system of claim 11, wherein the user interface is configured for storing usage data for the beverage dispensing system.

18. The beverage dispensing system of claim 17, wherein the usage data includes beverage data and time data.

19. The beverage dispensing system of claim 18, wherein the usage data further includes user data and is configured to report beverage usage data of the user.

20. A refrigerator comprising:
    a cabinet having at least one door for selective access to an interior portion of the cabinet;
    a beverage dispenser disposed on the door, the beverage dispenser comprising a nozzle, the nozzle being in fluid communication with at least one beverage to be dispensed;
    a user characteristic detecting device configured to wirelessly identify a user of the beverage dispenser; and
    a user interface in electrical communication with the user characteristic detecting device;
    wherein the user characteristic detecting device is configured to electrically communicate the identified user to the user interface; and
    wherein the user interface is configured to store data comprising user data, beverage data, and time data, and is configured to report beverage usage data of the user, and customize beverage settings and preferences associated with the user.

* * * * *